United States Patent [19]
Van Laningham et al.

[11] Patent Number: 5,250,921
[45] Date of Patent: Oct. 5, 1993

[54] FIELD ASSEMBLY FOR AN ELECTROMAGNET

[75] Inventors: Kalvin G. Van Laningham, Beloit, Wis.; Mark E. Blakeman, South Beloit, Ill.; Dwight E. Booth, Janesville, Wis.; John C. Carlson, Beloit, Wis.; Douglas J. Clemens, Garrett, Ind.; Stewart B. Dobson, Janesville, Wis.; Robert D. Keller, Roscoe, Ill.

[73] Assignee: Dana Corporation, Toledo, Ohio

[21] Appl. No.: 600,199

[22] Filed: Oct. 19, 1990

[51] Int. Cl.$^5$ .............................................. H01F 3/00
[52] U.S. Cl. .................................. 335/296; 192/84 R; 192/84 C; 336/199
[58] Field of Search ............................ 335/285–301; 192/84 R, 84 C; 336/199, 207, 208

[56] References Cited

U.S. PATENT DOCUMENTS

| | | | |
|---|---|---|---|
| 2,920,300 | 1/1960 | Oetzel et al. | 339/8 |
| 3,130,355 | 4/1964 | Younger | 317/158 |
| 3,325,760 | 6/1967 | Bernard | 335/281 |
| 4,210,890 | 7/1980 | Olsen | 335/281 |
| 4,935,713 | 6/1990 | Bekheet | 335/296 |

FOREIGN PATENT DOCUMENTS 2061305  6/1972  Fed. Rep. of Germany.

OTHER PUBLICATIONS

IBM Technical Disclosure Bulletin, vol. 26, No. 1, Jun. 1983.
Search Report issued Dec. 11, 1992 in the corresponding French application.

Primary Examiner—Leo P. Picard
Assistant Examiner—Raymond Barrera
Attorney, Agent, or Firm—Leydig, Voit & Mayer

[57] ABSTRACT

The preferred field assembly includes a field shell of generally T-shaped radial cross-section and molded of powdered metal, a plastic bobbin for supporting a multiple turn winding, and a plastic bobbin ring which covers part of the field shell and which helps hold the bobbin in assembled relation with the field shell. The bobbin is formed with a terminal block for supporting electrical leads which extend along grooves in the outboard face of one flange of the bobbin and which, together with the end portions of the winding, extend into potting cavities in the outboard face of the bobbin flange. The bobbin ring includes a cap which interfits with the terminal block to retain the leads. Various embodiments of field shells, bobbins and bobbin rings are disclosed.

32 Claims, 4 Drawing Sheets fig. 9.

FIELD ASSEMBLY FOR AN ELECTROMAGNET

BACKGROUND OF THE INVENTION

This invention relates to a field assembly for an electromagnet and, more particularly, to a field assembly for use in an electromagnetic coupling such as an electromagnetic clutch or brake. A field assembly for an electromagnetic coupling is disclosed in Olsen U.S. Pat. No. 4,210,890.

In general, a field assembly for an electromagnetic coupling comprises a bobbin molded of plastic and defined by a central tubular spool and by a pair of annular flanges which project radially outwardly from the ends of the spool. A coil is supported by the bobbin and is formed by multiple turns of comparatively small diameter magnet wire wound on the spool between the flanges. Typically, a terminal block is molded integrally with and projects axially from one of the flanges of the bobbin. The two ends of the coil of magnet wire are either connected electrically to metal terminals on the terminal block or are spliced to larger diameter and heavily insulated lead wires which extend from the terminal block.

Prior field assemblies also comprise a shell stamped from steel or other material having a low magnetic reluctance. The shell supports the bobbin and defines magnetic poles. When the coil is excited by a voltage source, magnetic flux threads through the shell and creates a magnetic field which, in most electromagnetic clutches and brakes, serves to attract a rotating armature into frictional engagement with a coacting member so as to engage the clutch or brake.

Electromagnetic clutches are widely used in conjunction with air conditioners for vehicles and serve to selectively establish a drive between the air conditioner compressor and the vehicle engine. When used in such applications, the clutch must be capable of transmitting high torque and yet must be radially and axially compact and light in weight. Also, the clutch must be reliable and capable of experiencing a long service life.

Cost is a major factor in the design of an electromagnetic clutch for an air conditioner compressor. Different compressors usually require different clutches and, even if the same basic clutch is used with the same compressor, different electrical terminal connections are often required when the compressor is used with different makes and models of vehicles. It is very costly to provide basically different tooling and basically different manufacturing and assembly equipment for several different versions of clutches. If a given version of a clutch is required in only relatively low volumes, the tooling cost can make the clutch prohibitively expensive.

SUMMARY OF THE INVENTION

The general aim of the present invention is to provide a new and improved electromagnetic field assembly having components which can be formed by modular tooling and/or by relatively simple and easily modifiable tooling so as to significantly reduce the cost of providing tooling for making a variety of field assemblies for different electromagnetic couplings.

A more detailed object of the invention is to achieve the foregoing by providing a field assembly whose shell is molded from powdered metal and may be made with relatively inexpensive molds or by molds which may be easily modified through the use of inserts.

A further object is to provide a bobbin which, through the use of modular tooling, may be made with various terminal configurations to accommodate the different terminal requirements of different applications.

Another object of the invention is to provide a field assembly in which the bobbin and the field shell are secured to one another in an extremely simple, inexpensive and effective manner.

Still another object is to provide a novel bobbin ring which helps secure the bobbin and field shell, which environmentally protects part of the field shell and which serves to retain and support the lead wires of the field assembly.

The invention also resides in the provision of a unique bobbin having effective and inexpensive means for permitting connection of the magnet wire and the lead wires and for helping to retain and reliably support the wires.

These and other objects and advantages of the invention will become more apparent from the following detailed description when taken in conjunction with the accompanying drawings.

DETAILED DESCRIPTION OF THE PREFERRED EMBODIMENTS

Figures 1, 2, 3:
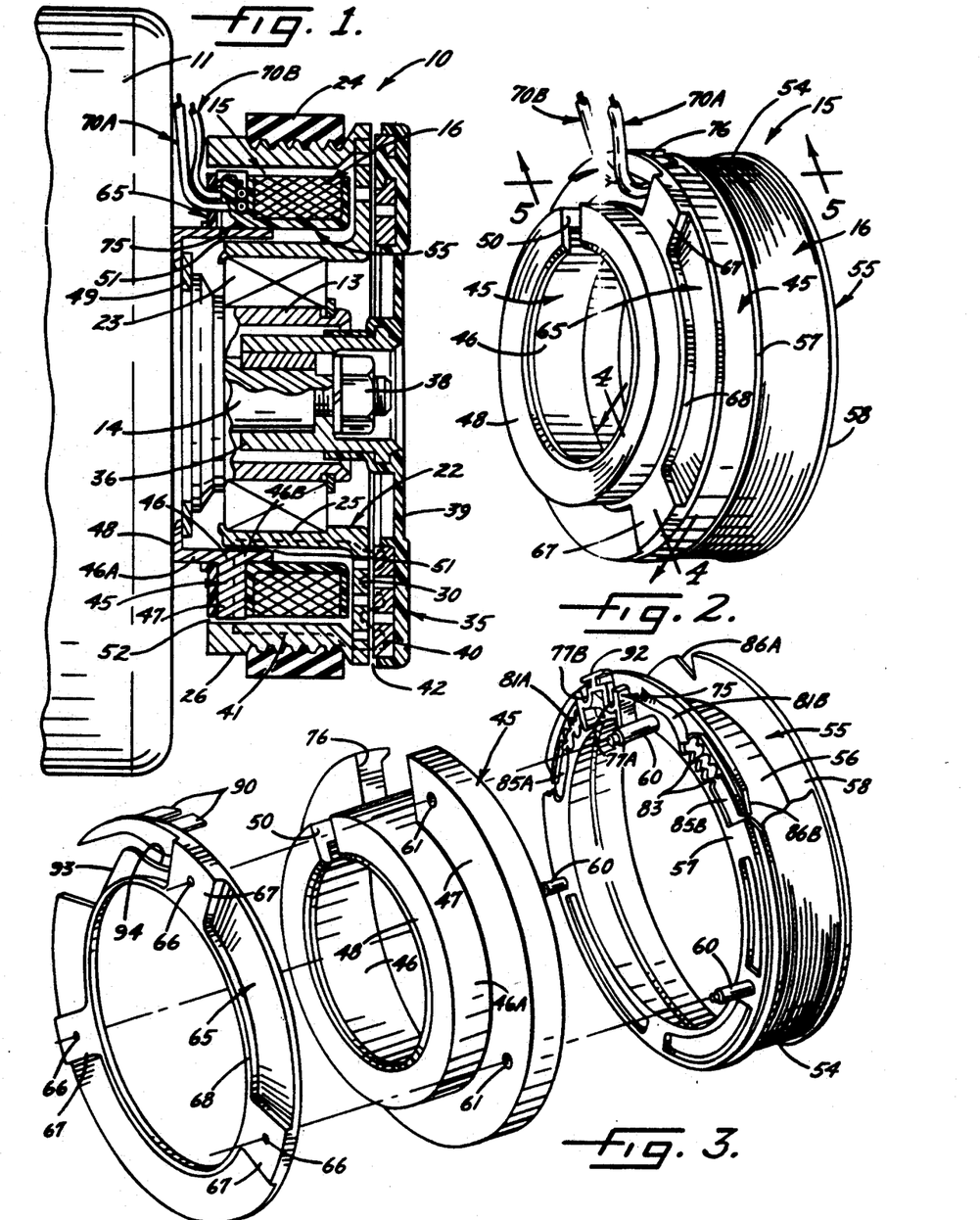
FIG. 1 is a sectional view taken axially through a typical electromagnetic coupling equipped with one embodiment of a new and improved field assembly incorporating the unique features of the present invention.
FIG. 2 is a perspective view of the field assembly.
FIG. 3 is an exploded perspective view of the three major components of the field assembly.

For purposes of illustration, the present invention has been shown in connection with an electromagnetic coupling 10 which could be a brake but which herein is in the form of an electromagnetic clutch. The clutch 10 is shown as being used in conjunction with an automobile air conditioning compressor 11 having a tubular nose 13 for mounting the clutch and having a drive shaft 14 which extends through the nose.

The clutch 10 includes an electromagnet formed in part by a field assembly 15 having a coil 16 adapted for connection to a voltage source, the field assembly to be described in more detail subsequently. The electromagnet further comprises an annular rotor 22 rotatably journaled on the nose 13 of the compressor 11 by a bearing 23 and adapted to be driven from the engine of the vehicle by an endless belt 24. The rotor is substantially U-shaped in radial cross-section and includes inner and outer concentric pole rings 25 and 26 made of a material having low magnetic reluctance, the inner pole ring being secured to the outer race of the bearing. Several axially spaced grooves extend circumferentially around the outer side of the outer pole piece ring and interfit with complemental ribs on the inner side of the drive belt. Accordingly, the outer pole piece defines a pulley for the belt.

Connected to and extending between the pole rings 25 and 26 of the rotor 22 is an axially facing friction face 30 which is circumferentially slotted in a conventional manner so as to define multiple magnetic poles. Located in opposing relation to the rotor face 30 is an armature assembly 35 having a tubular hub 36 telescoped onto the compressor shaft 14 and clamped to the shaft by a nut 38. A spider 39 made of resiliently yieldable material is insert molded on the hub and carries a steel armature disc 40 which is circumferentially slotted in a conventional fashion so as to form multiple magnetic poles.

When the coil 16 of the field assembly 15 is energized by the voltage source, magnetic flux is produced and threads a path indicated by the dashed line 41 in FIG. 1. The flux cuts back and forth across an air gap 42 between the friction face 30 of the rotor 22 and the armature disc 40 of the armature assembly 35. As a result, the armature disc is drawn into frictional engagement with the rotor face so as to couple the armature assembly to rotate in unison with the belt-driven rotor. Rotation of the armature assembly is transmitted to the shaft 14 in order to drive the compressor 11. When the coil 16 is de-energized, the resiliently yieldably spider 39 pulls the armature disc 40 away from the rotor face 30.

The present invention contemplates the provision of a new and improved field assembly 15 which is of relatively low cost in that the major components of the field assembly may be produced by modular tooling or by relatively inexpensive and easily modifiable tooling. As a result, different versions of field assemblies for different clutches 10 or for different compressor applications may be produced on an economical basis. Moreover, the components of the field assembly lend themselves to quick and easy assembly and result in a field assembly which is reliable and durable.

More specifically, the field assembly 10 shown in the embodiment of FIGS. 1 to 8 includes a shell 45 (FIG. 3) which is attached to the compressor 11 and which supports the coil 16. The shell is made of a material having low magnetic reluctance and, for economy of manufacture, preferably is molded of powdered metal. By virtue of molding the field shell, field shells of various sizes and configurations can be made with tooling which costs substantially less than forming punches and dies for making conventional stamped field shells.

Figures 4, 5, 8A:
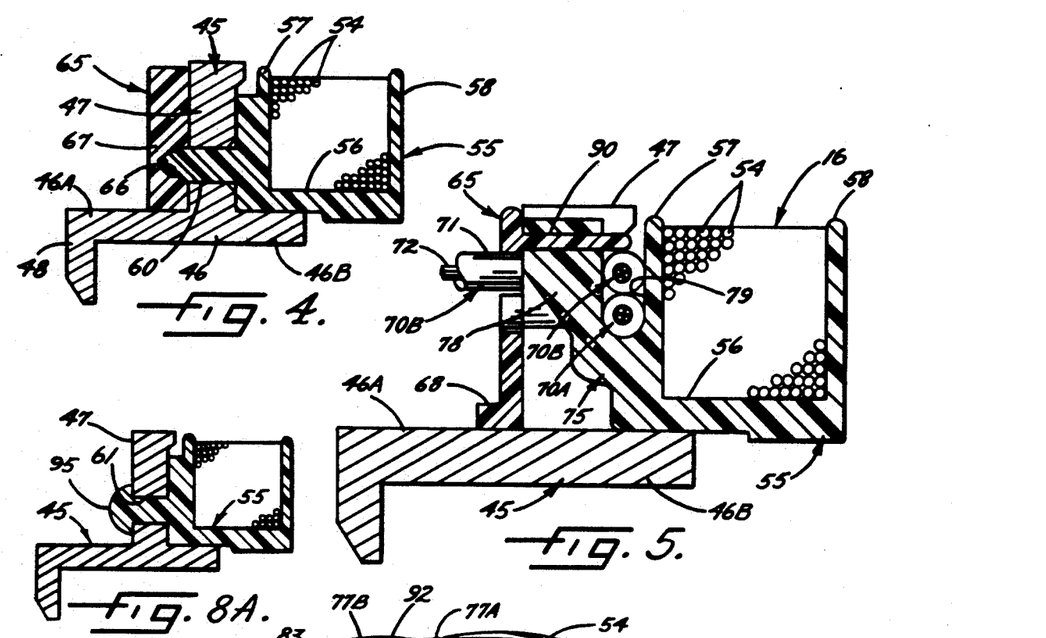
FIG. 4 is an enlarged fragmentary cross-section taken substantially along the line 4—4 of FIG. 2.
FIG. 5 is a cross-sectional view on a still larger scale and taken substantially along the line 5—5 of FIG. 2.
FIG. 8A is a view similar to FIG. 4 but shows another version of a field assembly.

The field shell 45 is of unique configuration in that the shell is basically T-shaped in radial cross-section (see FIGS. 1, 2 and 4). Thus, the shell includes a central tubular hub 46 and a flange 47 projecting radially outwardly from the hub between the ends thereof, the thickness of the flange being substantially greater than the thickness of the hub. One end portion 46A of the hub is formed with a radially inwardly extending annular lip 48 which is clamped between the end of the compressor 11 and a retaining ring 49 (FIG. 1) on the nose 13 of the compressor. A keyway 50 (FIG. 3) formed in the lip coacts with a key (not shown) on the compressor to prevent rotation of the field shell.

As shown in FIG. 1, the other end portion 46B of the hub 46 supports the coil 16 and is telescoped over the inner pole ring 25 of the rotor 22 with running clearance. In a similar manner, the flange 47 is telescoped with running clearance into the outer pole ring 26. With this arrangement, a narrow annular air gap 51 is defined between the outer diameter of the inner pole ring 25 of the rotor 22 and the inner diameter of the hub 46 of the field shell 45 while a similar annular air gap 52 is defined between the outer periphery of the flange 47 of the field shell and the inner diameter of the outer pole ring 26 of the rotor. When the coil 16 is excited, flux threads the path 41 and cuts between the flange 47 of the field shell and the outer pole ring 26 of the rotor across the air gap 52, cuts back and forth across the air gap 42 between the friction face 30 of the rotor and the armature disc 40 of the armature assembly 35, and completes the path between the rotor and the field shell by cutting across the air gap 51 between the inner pole ring 25 and the hub 46.

The field shell 45 of generally T-shaped radial cross-section is in contrast to more conventional shells having a U-shaped or J-shaped radial cross-section and enables the flange 47 to be thickened relative to the hub 46 so as to permit a greater volume of material to be placed in an area which typially has a high flux density. Because the field shell is molded of powdered metal, the relative thickness of the hub and the flange may be varied according to the requirements of a particular model of clutch by using inserts in a basic mold.

The coil 16 is supported on the end portion 46B of the hub 46 of the field shell 45. Herein, the coil is formed by multiple turns of relatively small diamter (e.g., 22 gauge) magnet wire 54 (FIGS. 4 and 5). wound helically on a bobbin 55 and having a starting end portion 54A (FIG. 6) and a finish end portion 54B. The bobbin 55 is molded of plastic and includes a central tubular spool 56 (FIGS. 3 to 5) and two annular flanges 57 and 58 formed integrally with and projecting radially from the ends of the spool. The magnet wire 54 is wound on the spool 56 of the bobbin 55 and is located between the opposing inboard faces of the flanges 57 and 58.

In this instance, the bobbin 55 is installed on the shell 45 by telescoping the spool 56 of the bobbin onto the end portion 46B of the hub 46 of the shell to locate the outboard face of the flange 57 of the bobbin in face-toface engagement with the opposing face of the flange 47 of the shell. In keeping with the invention, quick and easy attachment of the bobbin to the shell is effected by means of angularly spaced pins 60 (FIGS. 3 and 4) formed integrally with and extending axially from the outboard face of the flange 57. Herein, there are three such pins and they are adapted to project through three angularly spaced and axially extending holes 61 formed through the flange 47 of the shell. After the pins 60 have been inserted through the holes 61, retaining means on the free ends of the pins hold the bobbin and the shell in assembled relation.

While the retaining means may take various forms as will become apparent subsequently, the preferred retaining means is in the form of a bobbin ring 65 (FIGS. 2 to 5) molded of plastic and adapted to lie in face-to-face engagement with the side of field shell flange 47 located opposite the bobbin 55. Three angularly spaced and axially extending holes 66 (FIGS. 3 and 4) are formed in the bobbin ring and are shaped in accordance with the shape of the free end portions of the pins 60. After the pins have been inserted through the holes 61 in the field shell flange 47, the bobbin ring 65 is slipped over the pins. The pins are then subjected to an ultrasonic welding operation while the components 45, 55, and 65 are held in axially clamped relation. As a result, the free end portions of the pins bond with the walls of the holes 66 in the bobbin ring 65 so as to secure the bobbin ring and the bobbin 55 to the field shell 45.

As shown most clearly in FIG. 3, three angularly spaced pads 67 are molded on the exposed face of the bobbin ring 65 in the vicinity of the holes 66. The pads enable the length of the holes to be greater than the nominal thickness of the bobbin ring and thereby provide adequate material to effect a strong weld with the pins 60. An annular lip 68 of short axial length extends around the inner margins of the pads 67 and the inner diameter of the bobbin ring 65 and is piloted onto the end portion 46A of the hub 46 of the shell 45 to provide a relatively wide support band between the bobbin ring and the hub.

The bobbin ring 65 not only holds the field shell 45 and the bobbin 55 in assembled relation but also serves to cover and environmentally protect the adjacent face of the field shell flange 47. Since the opposite face of the flange 47 is covered and protected by the bobbin flange 57 and since the outer circumference of the flange 47 is covered by the outer pole ring 26 of the rotor 22, it is unnecessary in many cases to paint the field shell for the sake of appearance and environmental protection. Accordingly, the bobbin ring reduces the cost of producing the field shell.

A major problem in the manufacture of a field assembly resides in the difficulty in guiding the end portions 54A and 54B of the magnet wire 54 out of the bobbin 55, in connecting the magnet wire end portions to conductor means adapted to be connected to the voltage source, and in adequately protecting and mechanically supporting the magnet wire end portions and the conductor means. The present invention contemplates a unique construction which facilitates fast and easy manufacture of these aspects of the field assembly and which results in a mechanically strong and electrically sound support and connection for the magnet wire end portions and the conductor means.

More particularly, and in the embodiment shown in FIGS. 1 to 8, the conductor means are in the form of electrical leads 70A and 70B for connecting the voltage source to the magnet wire end portions 54A and and 54B, respectively. Each lead includes an outer insulating sheath 71 (FIG. 6) and further includes a conductor 72 made of several strands of twisted wire such as 22 gauge wire. The insulating sheath 71 of each lead 70A, 70B is stripped back adjacent one end portion of the lead to enable the end portion of the conductor 72 to be connected electrically to the respective magnet wire end portion 54A, 54B. Due to the insulating sheaths, the diameter of the leads 70A, 70B is significantly greater than the diameter of the magnet wire 54.

Pursuant to the invention, the bobbin 55 is formed with a block 75 which defines a platform for supporting portions of the leads 70A and 70B. In the embodiment shown in FIGS. 1 to 8, the block or platform 75 is molded integrally with and projects axially from the outboard face of the flange 57 of the bobbin 55. When the bobbin is assembled with the field shell 45, the block 75 extends into a window 76 (FIG. 3) formed axially through the flange 47 of the field shell 45, the window herein being defined by a notch which opens radially out of the outer periphery of the flange. The exposed axial face of the block either terminates short of or is flush with the adjacent face of the flange 57 so as to avoid interfering with the bobbin ring 65.

Formed in the outer side of the block 75 are two grooves 77A and 77B (FIGS. 6 and 7) for receiving portions of the leads 70A and 70B, respectively, each groove opening radially out of the block and also opening axially out of the exposed axial face of the block. The grooves curve about a half-round center post 78 of the block and define a semi-circle around the post when the bobbin is viewed radially from the free end of the post. As shown most clearly in FIG. 7, the groove 77A is somewhat deeper than the groove 77B and has a straight portion 79 (FIGS. 5 and 7) which extends between the flange 57 and the post 78 and terminates at the left side (FIG. 7) of the block 75. A straight groove portion 80 is formed in the right end portion of the block 75 at the same elevation as the shallow groove 77A and is located adjacent the flange 57.

Figures 6, 7, 8:
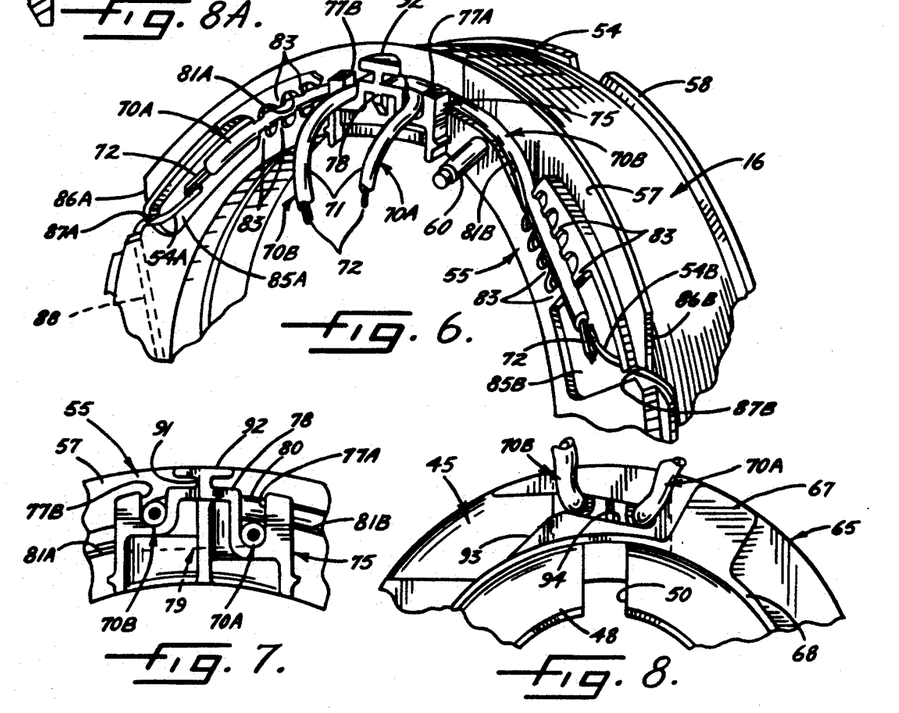
FIG. 6 is an enlarged perspective view of a portion of the bobbin.
FIG. 7 is a front elevational view of the terminal block of the bobbin.
FIG. 8 is a front elevational view showing the bobbin ring attached to the bobbin and partially covering the terminal block.

With the foregoing arrangement, the lead 70A may be seated in the curved groove 77A and looped around the post 78 into the straight groove portion 79. The lead 70B is seated in the curved groove 77B, loops reversely around the post in overlying relation with the lead 70A and then extends into the straight groove portion 80. As a result, the two leads are located and held angularly with respect to the block 75 and are guided along the outboard face of the bobbin flange 57.

Further in keeping with the invention, the outboard face of the bobbin flange 57 is uniquely grooved and configured to receive and securely hold the leads 70A and 70B. For this purpose, angularly extending grooves 81A and 81B (FIG. 7) are formed in the outboard face of the flange 57. The grooves 81A and 81B extend in opposite directions from the block 75 and, at the block, are located in substantial radial alignment with the groove portions 79 and 80, respectively. Portions of the leads 70A and 70B are pressed into and confined by the grooves 81A and 81B, respectively.

Advantageously, the grooves 81A and 81B are provided with means for securely retaining the leads 70A and 70B. Herein, these means comprise two opposing rows of spaced teeth 83 (FIG. 6) are formed along opposite edges of each groove. When the leads are pressed into the grooves, the teeth bite lightly into and grip the insulating sheaths 71 of the leads. Such gripping restricts lengthwise shifting of the leads and also prevents the leads from popping out of the grooves during final assembly procedures on the coil 16 and prior to installation of the bobbin ring 65.

As shown most clearly in FIG. 6, the exposed conductors 72 of the leads 70A and 70B are located in so-called potting cavities 85A and 85B formed in the outboard face of the bobbin flange 57 at the ends of the grooves 81A and 81B, respectively. The magnet wire end portion 54A, which is the innermost or starting end portion of the coil of magnet wire 54, extends into the cavity 85A and is there spliced (by soldering or by a splicing sleeve) to the exposed conductor 72 of the lead 70A. Ultimately, the cavity 85A and the toothed portion of the groove 81A are filled with an ultraviolet curable potting compound which, when cured, insulates the splice and immobilizes the magnet wire portion 54A and the adjacent portion of the lead 70A. To facilitate transition of the magnet wire portion 54A from the spool 56 to the cavity 85A, the periphery of the bobbin flange 57 is formed with a notch 86A (FIG. 6) and, in addition, the cavity 85A is notched adjacent the notch 86A as indicated at 87A thereby to permit the magnet wire end portion 54A to cross over the flange 57 and enter the cavity. A shallow groove 88 is formed in the inboard face of the bobbin flange 57 and guides the magnet wire end portion 54A from the spool 56 to the notch 87A.

The magnet wire end portion 54B is the outermost or finishing end portion of the coil of magnet wire 54 and extends into the potting cavity 85B via a generally V-shaped notch 86B (FIG. 6) in the periphery of the bobbin flange 57 and an adjacent notch 87B in the end of the cavity. After the magnet wire end portion 54B has been spliced to the conductor 72 of the lead 70B, the cavity 85B and the toothed portion of the groove 81B are filled with potting compound.

In order to hold the leads 70A and 70B radially in the grooves 77A and 77B, the bobbin ring 65 is formed with a cap 90 (FIG. 3) which herein is in the form of two angularly spaced and axially extending fingers which are molded integrally with the bobbin ring. During assembly of the bobbin ring with the field shell 45, the fingers 90 slide on top of the post 78 and in straddling relation with a narrow web 91 (FIG. 7) which projects upwardly from the post. In addition, the fingers slide beneath a lug 92 on the upper end of the web. The fingers 90 cover the grooves 77A and 77B and the leads 70A and 70B therein and, once the bobbin ring has been secured to the pins 60, the fingers prevent the leads from popping radially out of the grooves.

As shown in FIGS. 3 and 8, a rather wide cut-out 93 is formed in the periphery of the bobbin ring 65 and leads to a relatively narrow slot 94 formed through the ring. Just prior to assembly of the ring with the field shell 45, the free portions of the leads 70A and 70B are gathered by the edges of the cut-out 93 as the ring is turned counterclockwise (FIG. 3) and then are guided into the slot 94 during continued clockwise rotation of the ring to bring the fingers 90 into angular alignment with the block 75. When the bobbin ring is fully assembled with the field shell 45, the slot 94 helps retain the leads.

To summarize, the starting end portion 54A of the magnet wire 54 is located in the potting cavity 85A, the notches 87A and 86A and the groove 88 prior to winding of the wire on the spool 56 of the bobbin 55 and, upon the completion of such winding, the finish end portion 54B is threaded through the notches 86B and 87B and placed in the potting cavity 85B. The wire portions 54A and 54B make the transition from the spool into the cavities on comparatively large radii rather than sharp bends so as to reduce the danger of breaking or crimping the wire.

After the leads 70A and 70B have been spliced to the magnet wire end portions 54A and 54B, the potting compound is placed in the cavities 85A and 85B and the toothed portions of the grooves 81A and 81B while the bobbin 55 is lying on its side with the cavities and the grooves facing upwardly. Thus, the bobbin is in a stable position to allow easy fixturing, to enable consistent control of the flow of an optimum quantity of potting compound into the cavities and grooves, and to reduce spilling of the compound.

Once the leads 70A and 70B have been potted in place, tensile forces are imposed on the leads both during final assembly and installation of the field assembly 15 and when the field assembly is in service use. As a result, the insulating sheaths 71 of the leads tend to be stretched and reduced in diameter and if—as usually is the case— the potting compound is harder than the insulating sheaths, seams tend to form between the sheaths and the compound. By virtue of the teeth 83 gripping the sheaths, strain relief is afforded since each successive tooth takes up additional stress to stop the stretching of the sheaths and to help avoid the creation of seams between the sheaths and the potting compound. And, as mentioned above, the teeth hold the leads 70A and 70B securely in the grooves 81A and 81B to insure that the leads are properly positioned in the grooves during application and curing of the potting compound.

After the potting operation has been completed, the leads 70A and 70B are placed in the curved grooves 77A and 77B. By virtue of the leads curving in the grooves and around the post 78, the pulling stresses exerted by the leads on the potting compound and also on the splices are reduced so as to avoid fracturing of the potting compound and breaking of the splices.

Once the leads 70A and 70B have been threaded through the grooves 77A and 77B, the bobbin ring 65 is assembled with the bobbin 55. The fingers 90 not only hold the leads in the groove but also transfer radial stress on the bobbin ring directly to the bobbin 55 as a result of the fingers engaging the upper end of the post 78 and the lower side of the lug 92. This prevents breakage of the bobbin ring. The fingers also prevent the leads from raising upwardly into contact with the rotor 22 so as to avoid cutting of the leads by the rotor.

In the finished field assembly 15, the magnet wire starting end portion 54A exerts a tangential force which is opposed by an opposite tangential force from the finishing end portion 54B. Such oppositely directed forces assist in preventing rotation of the main coil of wire 54 on the spool 56 of the bobbin 55.

In some instances, the bobbin ring 65 may not be required. In such a case, the pins 60 of the bobbin 55 are merely inserted through the holes 61 of the field shell 45 as shown in FIG. 8A and then the free end of each pin is heat staked in order to form an enlargement 95 on the pin. The enlargements hold the bobbin 55 in assembled relation with the field shell 45.

Figures 9, 10, 11, 12, 13, 14, 15:
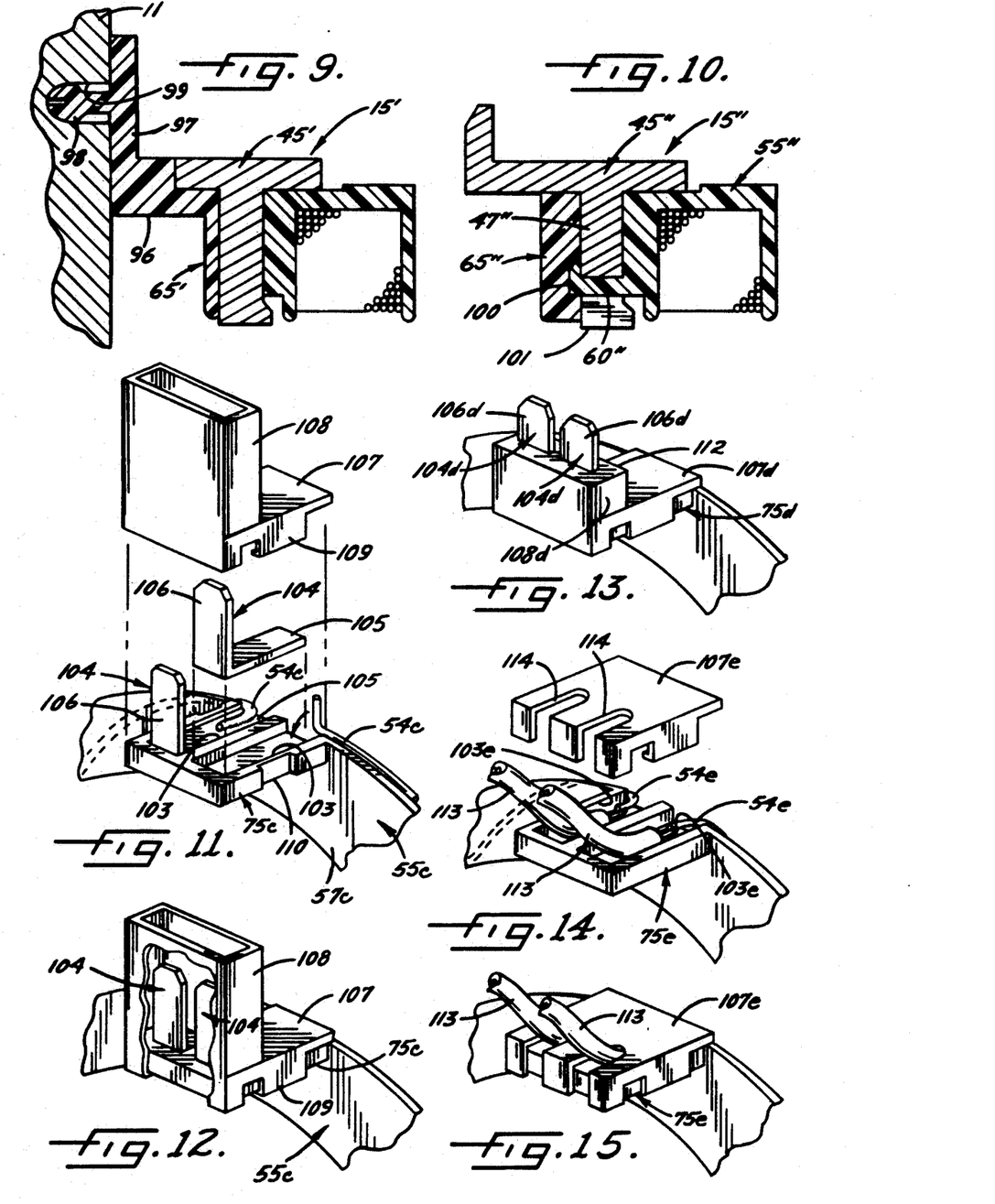
FIG. 9 is a fragmentary radial cross-section showing a field assembly with a modified bobbin ring.
FIG. 10 is a fragmentary radial cross-section a field assembly with modified means for attaching the bobbin to the field shell.
FIG. 11 is an exploded perspective view of a bobbin with a modified terminal block.
FIG. 12 is a perspective view of the components illustrated in FIG. 11 but shows the components in assembled relation.
FIG. 13 is a perspective view of a bobbin with another version of a terminal block.
FIG. 14 is an exploded perspective view of the components of still another embodiment of a terminal block.
FIG. 15 is a perspective view showing the components of the terminal block of FIG. 14 in assembled relation.

FIG. 9 shows a modified field assembly 15' with a bobbin ring 65' which is used to secure the field assembly 15 to the compressor 11. For this purpose, the bobbin ring 65' is formed with a mounting element having an annular portion 96 which projects axially from the inner margin of the ring. A second annular portion or disc 97 is formed integrally with and projects radially inwardly from the annular portion 96 and lies alongside the end of the compressor 11. Angularly spaced and axially extending pins 98 are formed integrally with the disc 97 and are adapted to be snapped into holes 99 in the compressor to secure the field assembly to the compressor. The field shell 45' may still be formed with a lip corresponding to the lip 48 of the first embodiment or, as shown in FIG. 9, such a lip may be omitted.

A field assembly 15" with a modified field shell 45" and a modified bobbin 55" is shown in FIG. 10 and is constructed to establish a temporary assembled relation between the field shell and the bobbin until such time as the bobbin ring 65" is installed. For this purpose, the pins 60" of the bobbin 55" are in the form of fingers having hooks 100 on their free ends. Instead of extending through holes, the fingers 60" snap within angularly spaced notches 101 formed in and opening radially out of the periphery of the flange 47" of the field shell. The snap fit holds the bobbin assembled to the shell until the bobbin ring 65" is installed and is ultrasonically welded to the hooks 100.

FIGS. 11 and 12 show a bobbin 55C having a platform-type terminal block 75C formed integrally with and projecting axially from the outboard face of the flange 57C of the bobbin and adapted to fit within the window of the field shell. The platform 75C is formed with a pair of side-by-side channels 103 (FIG. 12) which receive the starting and finishing end portions of a magnet wire 54C. Substantially L-shaped terminals 104 include horizontal portions 105 disposed in the channels in underlying relation with the magnet wire end portions and further include outwardly projecting portions 106 extending from the channels. The terminal portions 105 are adapted to be soldered or otherwise connected to the magnet wire end portions while the terminal portions 106 are adapted to receive the terminals (not shown) of lead wires.

The platform 75C is adapted to be covered by a plastic cap 107 (FIGS. 11 and 12) having a radially extending sleeve 108 for receiving the terminals 104. Fingers 109 on the lower side of the cap are sized to fit into notches 110 in the sides of the platform 75C and to hook beneath the platform in order to secure the cap to the platform with a snap fit. The cap is shown fully assembled with the platform in FIG. 12.

FIG. 13 shows a platform 75D associated with a snap-on cap 107D having a shorter sleeve 108D. Instead of being enshrouded by the sleeve, the portions 106D of the terminals 104D project radially outwardly from the sleeve by means of slots formed in an integral cover 112 on the upper end of the sleeve.

A platform 75E with channels 103E for receiving leads 113 is shown in FIGS. 14 and 15, the leads being spliced to magnet wires 54E in the channels. The platform 75E is adapted to be covered by a snap-on cap 107E formed with notches 114 for accommodating the leads. The cap is shown prior to assembly with the platform in FIG. 14 and after assembly in FIG. 15.

Figure 16:
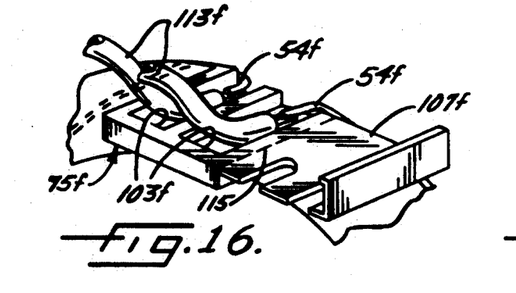
FIG. 16 is a perspective view of a different terminal block and shows the cap of the block in an open position.
Figure 17:
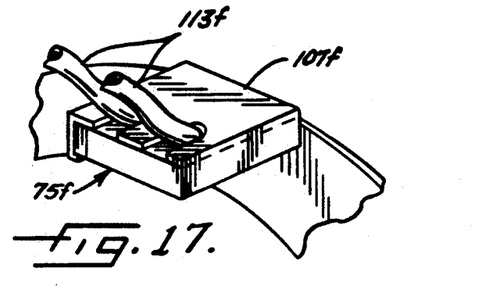
FIG. 17 is a perspective view of the terminal block of FIG. 16 and shows the cap closed and fully assembled.

FIGS. 16 and 17 show a platform 75F generally similar to that of FIGS. 14 and 15 but having an integral cap 107F. The latter is swingably connected to the platform by a living hinge 115 formed between adjacent margins of the cap and the platform. By pivoting the cap out of the hinge, the cap may be swung from an open position shown in FIG. 16 to a snap-closed position shown in FIG. 17. When the cap is open, leads 113F may be connected to magnet wire end portions 54F in the channels 103F of the platform.

Figure 18:
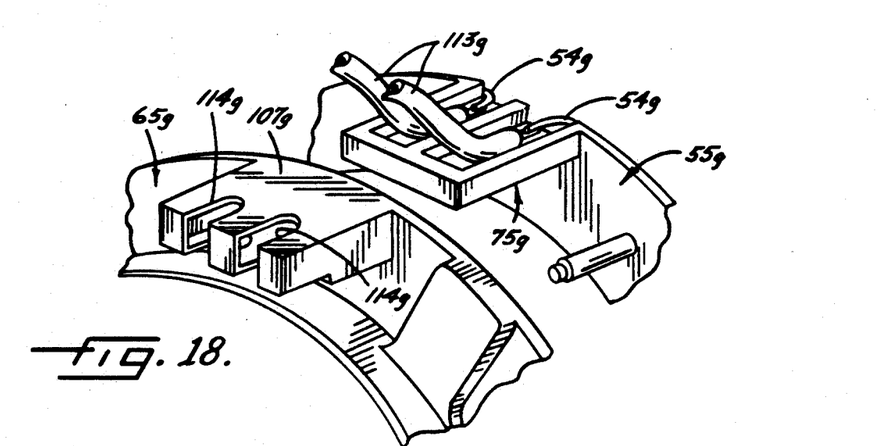
FIG. 18 is an exploded fragmentary perspective view of still another embodiment of a bobbin and bobbin ring.

A platform 75G which is virtually identical to the platform 75E of FIGS. 14 and 15 is shown in FIG. 18. In this instance, however, the platform, the wires 54G and the leads 113G are adapted to be covered by a cap 107G molded integrally with and extending axially from the bobbin ring 65G. The cap telescopes with the platform as an incident to assembly of the bobbin ring with the bobbin 55G and is formed with notches 114G for accommodating the leads 113G.

Figure 19:
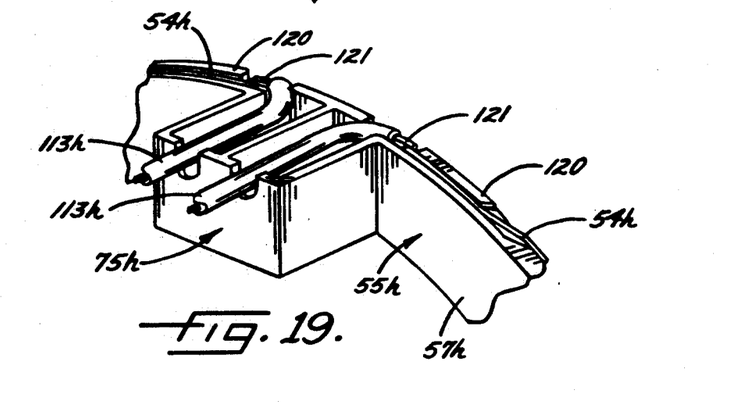
FIG. 19 is a fragmentary perspective view of yet another bobbin.

FIG. 19 shows a bobbin 55H with a terminal block or platform 75H which receives the leads 113H but not the magnet wires 54H. Instead, portions of the magnet wires 54H extend along the outer periphery of the flange 57H of the bobbin and are held in channels defined in part by lips 120 on the flange. The end portions of the magnet wires are spliced to the conductors of the leads in potting cavities 121 located adjacent the ends of the block 75H. The potting cavities are open to the main winding of magnet wire and thus the potting compound securely holds the splice against the winding. Because the magnet wires terminate along the flange 57H, they do not make a sharp bend into the platform 75H.

It will be apparent from the foregoing that the various platforms 75C to 75H may be used to effect different types of terminal connections for the field assembly depending upon the requirements of a particular compressor manufacturer or particular vehicle manufacturer. In many cases, a platform of the same design may be used for different types of terminal connections and thus a common bobbin may be employed. Where slight variations may be required in the platform, such variations may be accommodated by using inserts in the basic mold for making the bobbin so as to avoid the need of a completely different mold. In some cases, therefore, a basic mold may be used for the main body of the bobbin and a modular supplemental mold insert may be used for the specific platform. The same tooling concept may be applied to the bobbin ring when such a ring is employed. The end result is a reduction in overall tooling costs for producing the components of various designs of field assemblies.

We claim:

1. A field assembly for an electromagnet adapted to be excited by a voltage source, said field assembly comprising an annular bobbin molded of plastic, said bobbin having a generally cylindrical tubular spool and having an annular flange molded integrally with and projecting radially outwardly from the spool, said flange having inboard and outboard sides, a multiple turn winding of electrical wire supported on said spool adjacent the inboard face of said flange and adapted to be connected to said voltage source, a terminal block molded integrally with and projecting axially from the outboard face of said flange, a field shell molded of powdered metal having low magnetic reluctance, said shell having a tubular hub and having an annular flange formed integrally with and projecting radially outwardly from said hub between the ends thereof whereby said shell is generally T-shaped in radial cross-section, a window extending axially through one end portion of the flange of said shell, said bobbin being assembled with said shell with the spool of said bobbin telescoped over one end portion of said hub, with the outboard face of the flange of said bobbin lying in face-to-face engagement with a first axially facing side of the flange of said shell, and with said terminal block extending into said window, and means for holding said bobbin in assembled relation with said shell.

2. A field assembly as defined in claim 1 in which said means comprise a bobbin ring lying in face-to-face engagement with a second axially facing side of the flange of said shell.

3. A field assembly as defined in claim 2 further including lead wires connected to said winding, and coacting means on said terminal block and said bobbin ring for supporting and retaining said lead wires.

4. A field assembly as defined in claim 1 in which the axial thickness of the flange of said shell is substantially greater than the radial thickness of the tubular hub of the shell.

5. A field assembly for an electromagnet adapted to be excited by a voltage source, said field assembly comprising an annular bobbin made of plastic, said bobbin having a generally cylindrical tubular spool and having an annular flange molded integrally with and projecting radially outwardly from the spool, said flange having inboard and outboard faces, a multiple turn winding of electrical wire supported on said spool adjacent the inboard face of said flange and having first and second end portions, electrically conductive means connected electrically to said first end portion of said winding for connecting said winding to said voltage source, a block molded integrally with and projecting axially from the outboard face of said flange and formed with means for supporting said electrically conductive means, a series of angularly spaced mounting pins molded integrally with and projecting outwardly from the outboard face of said flange, a field shell made of a material having low magnetic reluctance, said shell having a tubular hub and having an annular flange formed integrally with and projecting radially outwardly from said hub in spaced relation with one end thereof, a window extending axially through the flange of said shell, a series of angularly spaced and axially extending openings formed through the flange of said shell, said bobbin being assembled to said shell with said spool telescoped with said hub, with said flanges located in face-to-face engagement with one another, with said block extending into said window and with said pins extending through said holes, and retaining means on the free ends of said pins for holding said bobbin and said shell in assembled relation.

6. A field assembly as defined in claim 5 in which said retaining means comprise a ring made of plastic and telescoped with said hub in face-to-face engagement with the flange of said shell, said ring being formed with a series of angularly spaced holes which receive said pins.

7. A field assembly as defined in claim 6 further including a mounting element molded integrally with said ring, said mounting element having a first annular portion projecting axially from the inner margin of said ring and having a second annular portion projecting radially inwardly from the free end of said first annular portion.

8. A field assembly as defined in claim 7 further including a series of angularly spaced mounting pins formed integrally with and projecting axially from said second annular portion.

9. A field assembly as defined in claim 5 in which said block comprises a platform having a channel therein for receiving said electrically conductive means.

10. A field assembly as defined in claim 9 further including a cap connected to said platform and covering said channel.

11. A field assembly as defined in claim 10 further including means formed integrally with said cap for securing the cap to the platform with a snap fit.

12. A field assembly as defined in claim 10 in which said cap is molded integrally with said platform and includes a living hinge which supports said cap to swing between open and closed positions relative to said platform.

13. A field assembly as defined in claim 6 in which said block comprises a platform having a channel therein for receiving said electrically conductive means.

14. A field assembly as defined in claim 13 further including a cap covering said channel, said cap being molded integrally with and projecting axially from said ring.

15. A field assembly as defined in claim 9 in which said electrically conductive means comprise an electrical lead of larger diameter than said electrical wire of said winding and disposed in said channel, said lead and said electrical wire being joined to one another at a location within said channel.

16. A field assembly as defined in claim 9 in which said electrically conductive means comprise a conductive terminal having a first portion disposed in said channel and connected to said electrical wire of said winding at a location in said channel, said terminal having a second portion integral with said first portion and projecting from said channel.

17. A field assembly for an electromagnet, said field assembly comprising an annular bobbin made of plastic, said bobbin having a generally cylindrical tubular spool and having an annular flange molded integrally with and projecting radially outwardly from one end of the spool, said flange having inboard and outboard faces, a multiple turn winding of electrical wire supported on said spool adjacent the inboard face of said flange and having first and second end portions, first and second electrical leads of larger diameter than the wire of said winding and connected electrically to said first and second end portions, respectively, of said winding, a terminal block molded integrally with and projecting axially from the outboard face of said flange and formed with means for supporting said leads, a series of angularly spaced mounting pins molded integrally with and projecting outwardly from the outboard face of said flange, a field shell made of a material having low magnetic reluctance, said shell having a tubular hub and having an annular flange formed integrally with and projecting radially outwardly from said hub between the ends thereof, a window extending axially through the flange of said shell, a series of angularly spaced and axially extending holes formed through the flange of said shell, said bobbin being assembled to said shell with said spool telescoped onto said hub, with said flanges in face-to-face engagement, with said terminal block extending into said window, and with said pins extending through said holes, and retaining means on the free ends of said pins for holding said bobbin and said shell in assembled relation.

18. A field assembly as defined in claim 17 in which said window comprises a notch formed through the flange of said shell and opening out of the outer periphery of such flange.

19. A field assembly as defined in claim 17 in which said retaining means comprise a ring made of plastic and telescoped onto said hub in face-to-face engagement with the flange of said shell, said ring being formed with a series of angularly spaced holes which receive said pins.

20. A field assembly as defined in claim 19 in which said pins are ultrasonically welded to the walls of the holes in said ring.

21. A field assembly as defined in claim 17 in which said retaining means comprise enlargements on the free ends of said pins and formed by heat staking the pins.

22. A field assembly as defined in claim 17 in which said pins are in the form of fingers which engage the flange of said field shell with a snap fit.

23. A field assembly as defined in claim 19 in which said means for supporting said leads comprise first and second radially outwardly opening grooves formed in said terminal block and receiving portions of the respective leads, said grooves also opening axially out of the outboard end of said terminal block, a cap projecting axially from said ring, said cap extending into said window and covering said grooves and the portions of the leads therein.

24. A field assembly as defined in claim 23 further including interfitting means on said cap and said terminal block to restrict radial and angular movement of said ring relative to said bobbin.

25. A field aembly as defined in claim 17 in which said means for supporting said leads comprise first and second radially outwardly opening grooves formed in said terminal block and receiving portions of the respective leads, said grooves also opening axially out of the outboard end of said terminal block.

26. A field assembly as defined in claim 25 further including axially opening grooves formed in the outboard face of the flange of said bobbin and receiving other portions of said leads.

27. A field assembly as defined in claim 26 further including teeth formed along opposing edges of each axially opening groove for gripping the respective lead.

28. A field assembly as defined in claim 27 further including notchs formed in the periphery of the flange of said bobbin and accommodating said end portions of said winding to enable said end portions of said winding to cross over the flange of said bobbin for connection to said leads.

29. A field assembly for an electromagnet adapted to be excited by a voltage source, said field assembly comprising a shell made of a material having low magnetic reluctance, and a bobbin made of plastic and supported by and secured to said shell, said bobbin having a generally cylindrical tubular spool and having an annular flange molded integrally with and projecting radially outwardly from the spool, said flange having inboard and outboard faces, a multiple turn winding of electrical wire of relatively small diameter, said winding being supported on said spool adjacent the inboard face of said flange and having a starting end portion and a finishing end portion, a pair of angularly spaced notches formed in the periphery of said flange and permitting said wire end portions to cross over said flange to the outboard face thereof, a pair of angularly spaced potting cavities formed in the outboard face of said flange for receiving the free ends of said wire end portions, first and second electrical leads of greater diameter than the wire of said winding and adapted to be connected to said starting and finishing wire end portions, respectively, a terminal block molded integrally with said flange between said notches and extending axially from the outboard face of said flange, first and second axially and radially outwardly opening grooves formed in said terminal block and receiving portions of said first and second leads, respectively, first and second additional grooves formed in the outboard face of said flange and receiving additional portions of said first and second leads, respectively, said first additional groove in said flange extending from said first groove in said block to the potting cavity for said starting wire end portion, said second additional groove in said flange extending from said second groove in said block to the potting cavity for said finishing wire end portion, and said first and second leads having conductors joined electrically to said starting wire end portion and said finishing wire end portion, respectively, in said potting cavities.

30. A field assembly as defined in claim 29 in which said first and second grooves are curved and generally define a semi-circle, said first groove being deeper than said second groove.

31. A field assembly as defined in claim 30 including a post projecting radially outwardly from said terminal block and located between said first and second grooves.

32. A field assembly as defined in claim 29 in which each of said first and second additional grooves has opposing edges with teeth spaced therealong for gripping said leads.

* * * * *